United States Patent
Ho

(10) Patent No.: US 7,283,432 B2
(45) Date of Patent: Oct. 16, 2007

(54) METHOD AND DEVICE FOR CORRECTING OPTICAL PATH DEVIATION OF AN OPTICAL PICKUP IN AN OPTICAL RECORDING SYSTEM

(75) Inventor: Hsu-Feng Ho, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 553 days.

(21) Appl. No.: 10/912,007

(22) Filed: Aug. 5, 2004

(65) Prior Publication Data

US 2005/0243665 A1 Nov. 3, 2005

(30) Foreign Application Priority Data

May 3, 2004 (TW) .................................. 93112357 A

(51) Int. Cl.
*G11B 7/00* (2006.01)
(52) U.S. Cl. .................. 369/44.11; 369/44.25; 369/44.35
(58) Field of Classification Search .............. 369/44.41, 369/44.42, 47.1, 47.27, 124.1, 124.01, 124.12, 369/124.15, 44.25, 44.26, 44.34, 44.35
See application file for complete search history.

(56) References Cited

U.S. PATENT DOCUMENTS 6,690,628 B2 * 2/2004 Yoshimi et al. .......... 369/44.28

* cited by examiner

*Primary Examiner*—Nabil Z. Hindi
(74) *Attorney, Agent, or Firm*—Thomas, Kayden, Horstemeyer & Risley

(57) ABSTRACT

A device for correcting optical path deviation of an optical pickup in an optical recording system includes a push-pull signal generator for generating a push-pull signal while the optical pickup is operated in a focusing and non-track-locking state, a low-pass filter module for generating a direct current (DC) level error signal from the push-pull signal, and a combiner for generating a calibrating servo signal based on the DC level error signal and a servo control signal from a servo controller of the optical recording system and for applying the calibrating servo signal to a servo mechanism of the optical recording system so as to adjust position of an objective lens of the optical pickup in order to maintain the DC level of the push-pull signal at an ideal level.

14 Claims, 4 Drawing Sheets

METHOD AND DEVICE FOR CORRECTING OPTICAL PATH DEVIATION OF AN OPTICAL PICKUP IN AN OPTICAL RECORDING SYSTEM

CROSS-REFERENCE TO RELATED APPLICATION

This application claims priority of Taiwanese application no. 093112357, filed on May 3, 2004.

BACKGROUND OF THE INVENTION

1. Field of the Invention

The invention relates to an optical recording system, more particularly to a method and device for correcting optical path deviation of an optical pickup in an optical recording system so as to improve the recording and playback quality while keeping manufacturing costs low.

2. Description of the Related Art

Referring to FIG. 1, a conventional optical recording system 1 is shown to include a spindle motor 10 for driving rotation of an optical recording medium 2, a first servo controller 11 for controlling operation of the spindle motor 10, an optical pickup 12 for recording data onto and reading data from the optical recording medium 2, a sled motor 13 for driving radial movement of the optical pickup 12 relative to the optical recording medium 2, a second servo controller 14 for controlling operation of the sled motor 13 and adjustment of an objective lens 121 of the optical pickup 12, a pre-amplifier 15 for receiving the output of a photo detector 122 of the optical pickup 12, a central processing unit (CPU) 16, a digital signal processor (DSP) 17 controlled by the CPU 16 for processing signals from the pre-amplifier 15 and for controlling operations of the first and second servo controllers 11, 14, and a decoder 18 for decoding data read from the optical recording medium 2.

To meet consumer demands for reasonable prices, manufacturers of optical recording systems have to continuously strive to find ways to lower manufacturing costs. As a result, the precision requirements for fabricating and installing the optical pickup 12, which is a critical component of the optical recording system 1, are typically sacrificed. Moreover, proper biasing of an internal circuit of the second servo controller 14, which is responsible for focusing and track-locking control of the optical pickup 12, is also sacrificed such that an output signal of the second servo controller 14 may be non-zero when an input thereto is zero. In addition, warping of the optical recording medium 2 is likely to occur during recording and/or playback due to errors in the manufacturing process and non-ideal operating conditions.

The aforesaid factors can result in optical path deviation of the optical pickup 12, i.e., with reference to FIG. 2, when the optical pickup 12 is used to record data onto or read data from an optical recording medium, the light beam 20 reflected from the optical recording medium deviates from and does not coincide with a central portion of the photo detector 122 (which includes a 2×2 array of light-sensing regions (A), (B), (C), (D)). Hence, when the DSP 17 controls the second servo controller 14, the servo control signals generated by the second servo controller 14 contain undesired bias components, which degrade the recording and playback quality.

Therefore, there is always a need in the industry to find ways to improve the recording and playback quality while keeping manufacturing costs low.

SUMMARY OF THE INVENTION

The main object of the present invention is to provide a method and device for correcting optical path deviation of an optical pickup in an optical recording system.

Another object of this invention is to provide an optical recording system that includes a correcting device for correcting optical path deviation of an optical pickup in the optical recording system.

According to one aspect of the present invention, there is provided a method for correcting optical path deviation of an optical pickup in an optical recording system. The optical pickup includes a laser diode for emitting a laser beam, an objective lens for receiving and projecting the laser beam onto an optical recording medium, and a photo detector for detecting the light beam reflected by the optical recording medium. The optical recording system includes a servo mechanism for focusing and track-locking control of the optical pickup, and a servo controller for controlling operation of the servo mechanism. The method comprises the steps of:

a) generating a push-pull signal from output of the photo detector while the optical pickup is operated in a focusing and non-track-locking state;

b) generating a direct current (DC) level error signal by subjecting the push-pull signal to low-pass filtering; and c) generating a calibrating servo signal based on the DC level error signal and a servo control signal from the servo controller, the calibrating servo signal being applied to the servo mechanism for adjusting position of the objective lens so as to maintain the DC level of the push-pull signal at an ideal level.

According to another aspect of the present invention, there is provided a correcting device for correcting optical path deviation of an optical pickup in an optical recording system. The optical pickup includes a laser diode for emitting a laser beam, an objective lens for receiving and projecting the laser beam onto an optical recording medium, and a photo detector for detecting the light beam reflected by the optical recording medium. The optical recording system includes a servo mechanism for focusing and track-locking control of the optical pickup, and a servo controller for controlling operation of the servo mechanism.

The correcting device comprises a push-pull signal generator adapted to be coupled to the photo detector and operable so as to generate a push-pull signal from output of the photo detector while the optical pickup is operated in a focusing and non-track-locking state, a low-pass filter module coupled to the push-pull signal generator and operable so as to generate a DC level error signal by subjecting the push-pull signal to low-pass filtering, and a combiner coupled to the low-pass filter module, adapted to be coupled to the servo controller, and operable so as to generate a calibrating servo signal based on the DC level error signal and a servo control signal from the servo controller. The combiner is adapted to apply the calibrating servo signal to the servo mechanism for adjusting position of the objective lens so as to maintain the DC level of the push-pull signal at an ideal level.

According to yet another aspect of the present invention, there is provided an optical recording system that comprises an optical pickup, a servo mechanism, a servo controller, and a correcting device. The optical pickup includes a laser diode for emitting a laser beam, an objective lens for receiving and projecting the laser beam onto an optical recording medium, and a photo detector for detecting the light beam reflected by the optical recording medium. The servo mechanism is coupled to the optical pickup for focusing and track-locking control of the optical pickup. The servo controller is coupled to and controls operation of the servomechanism. The correcting device includes a push-pull signal generator, a low-pass filter, and a combiner. The push-pull signal generator is coupled to the photo detector, and is operable so as to generate a push-pull signal from output of the photo detector while the optical pickup is operated in a focusing and non-track-locking state. The low-pass filter module is coupled to the push-pull signal generator, and is operable so as to generate a DC level error signal by subjecting the push-pull signal to low-pass filtering. The combiner is coupled to the low-pass filter module and the servo controller, and is operable so as to generate a calibrating servo signal based on the DC level error signal and a servo control signal from the servo controller. The combiner applies the calibrating servo signal to the servo mechanism for adjusting position of the objective lens so as to maintain the DC level of the push-pull signal at an ideal level.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
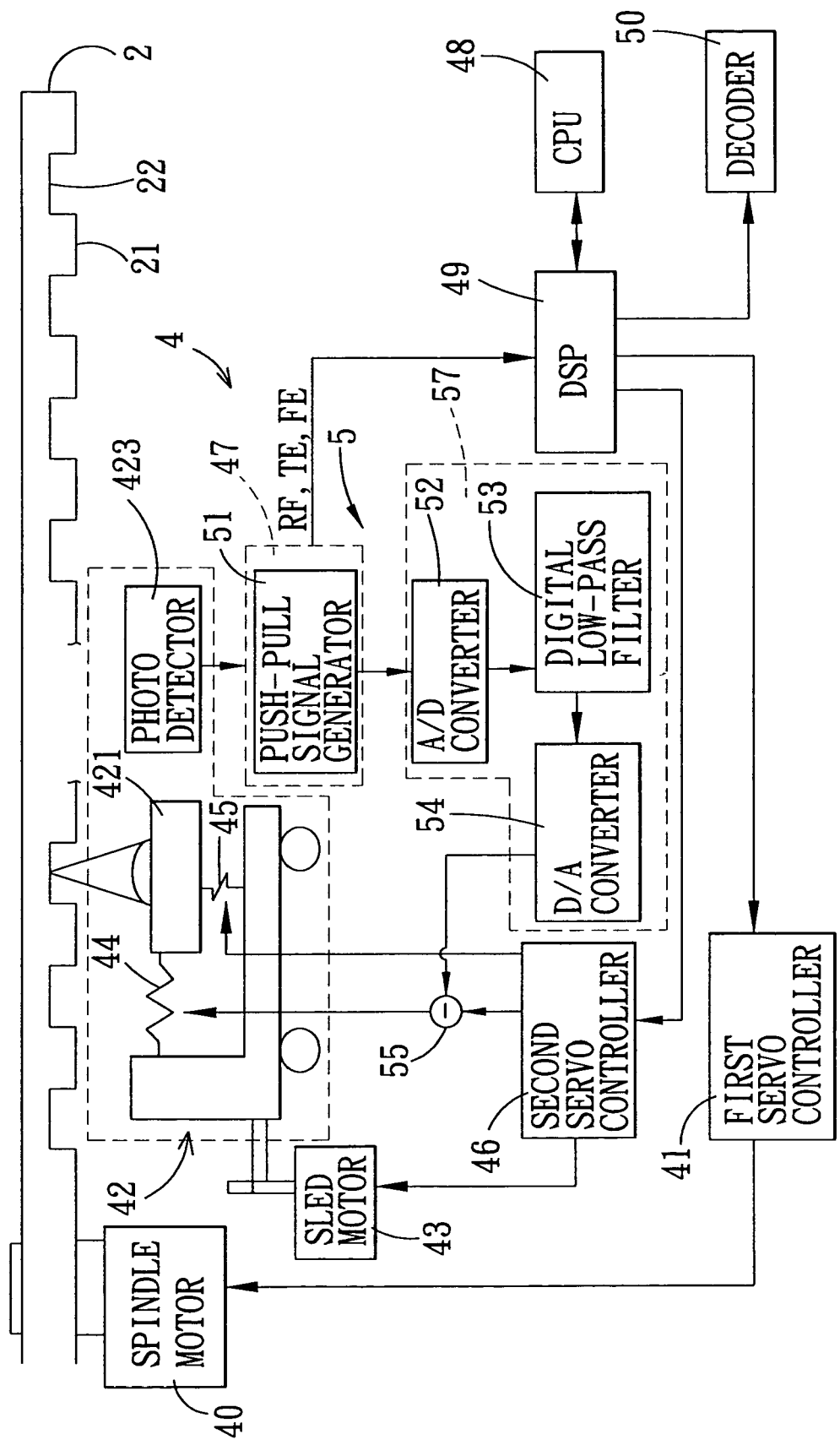
FIG. 3 is a schematic circuit block diagram of an optical recording system that incorporates the preferred embodiment of a device for correcting optical path deviation of an optical pickup according to the present invention.

FIG. 3 illustrates an optical recording system 4 that incorporates the preferred embodiment of a correcting device 5 according to the present invention for correcting optical path deviation of an optical pickup 42 in the optical recording system 4.

The optical recording system 4 includes a spindle motor 40 for driving rotation of an optical recording medium 2, a first servo controller 41 for controlling operation of the spindle motor 40, the optical pickup 42 for recording data onto and reading data from the optical recording medium 2, a sled motor 43 and a track-locking voice coil motor 44 for driving movement of the optical pickup 42, a focusing motor 45, a second servo controller 46 for controlling the focusing motor 45, a pre-amplifier 47 coupled to and receiving output signals from the optical pickup 42, a central processing unit (CPU) 48, a digital signal processor (DSP) 49 controlled by the CPU 48 to process signals outputted from the pre-amplifier 47 and to control operations of the first and second servo controllers 41, 46, and a decoder 50 for decoding data read from the optical recording medium 2.

Figure 4:
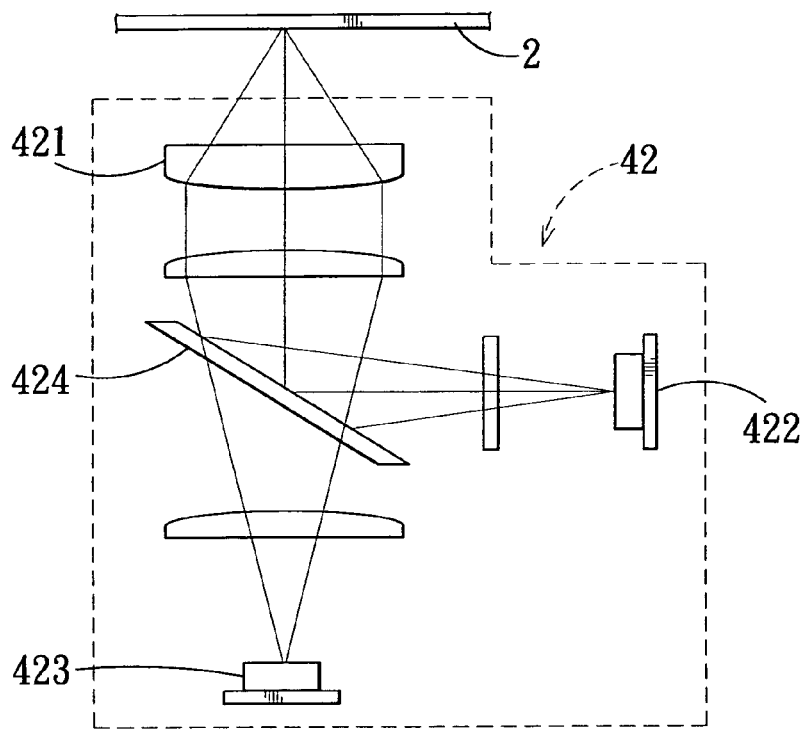
FIG. 4 is a schematic diagram to illustrate an optical pickup of the optical recording system of FIG. 3.
Figure 5:
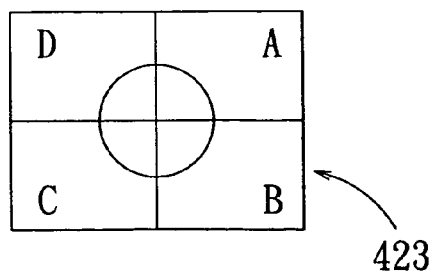
FIG. 5 illustrates a photo detector of the optical pickup of FIG. 4.

As best shown in FIG. 4, the optical pickup 42 includes a laser diode 422 for emitting a laser beam, a beam splitter 424, an objective lens 421, and a photo detector 423. The beam splitter 424 directs the laser beam from the laser diode 422 to the objective lens 421. The objective lens 421 projects the laser beam from the beam splitter 424 onto the optical recording medium 2. The laser beam reflected by the optical recording medium 2 passes through the objective lens 421, and is directed by the beam splitter 424 to the photo detector 423. Referring to FIG. 5, in this embodiment, the photo detector 423 includes a 2×2 array of light-sensing regions (A), (B), (C), (D).

Referring once again to FIG. 3, the sled motor 43 is operable so as to drive the optical pickup 42 for long-range track seeking in a conventional manner. The voice coil motor 44 is operable so as to drive the objective lens 421 of the optical pickup 42 for short-range track-seeking or track-locking in a conventional manner. The focusing motor 45 is operable so as to drive the objective lens 421 for focusing control in a conventional manner. The voice coil motor 44 and the focusing motor 45 are hereinafter referred to as a servo mechanism for the objective lens 421.

The preferred embodiment of the correcting device 5 according to this invention includes a push-pull signal generator 51, a low-pass filter module 57, and a combiner 55. The push-pull signal generator 51 is built into the pre-amplifier 47, which is coupled to the photo detector 423, and is operable so as to generate a push-pull signal from the output of the photo detector 423 while the optical pickup 42 is operated in a focusing and non-track-locking state. The low-pass filter module 57 is coupled to the push-pull signal generator 51, and is operable so as to generate a direct current (DC) level error signal by subjecting the push-pull signal to low-pass filtering. In this embodiment, the low-pass filter module 57 includes an analog-to-digital (A/D) converter 52 for converting the push-pull signal into a digital signal, a digital low-pass filter 53 coupled to the A/D converter 52 and operable so as to subject the digital signal to digital low-pass filtering to result in a digital DC level, and a digital-to-analog (D/A) converter 54 coupled to the digital low-pass filter 53 and operable so as to convert the digital DC level into the DC level error signal in an analog form. The combiner 55 is coupled to the low-pass filter module 57 and the second servo controller 46, and is operable so as to generate a calibrating servo signal based on the DC level error signal and a servo control signal from the second servo controller 46. The combiner 55 applies the calibrating servo signal to the voice coil motor 44 of the servo mechanism for adjusting the position of the objective lens 421 so as to maintain the DC level of the push-pull signal at an ideal level.

Figure 1:
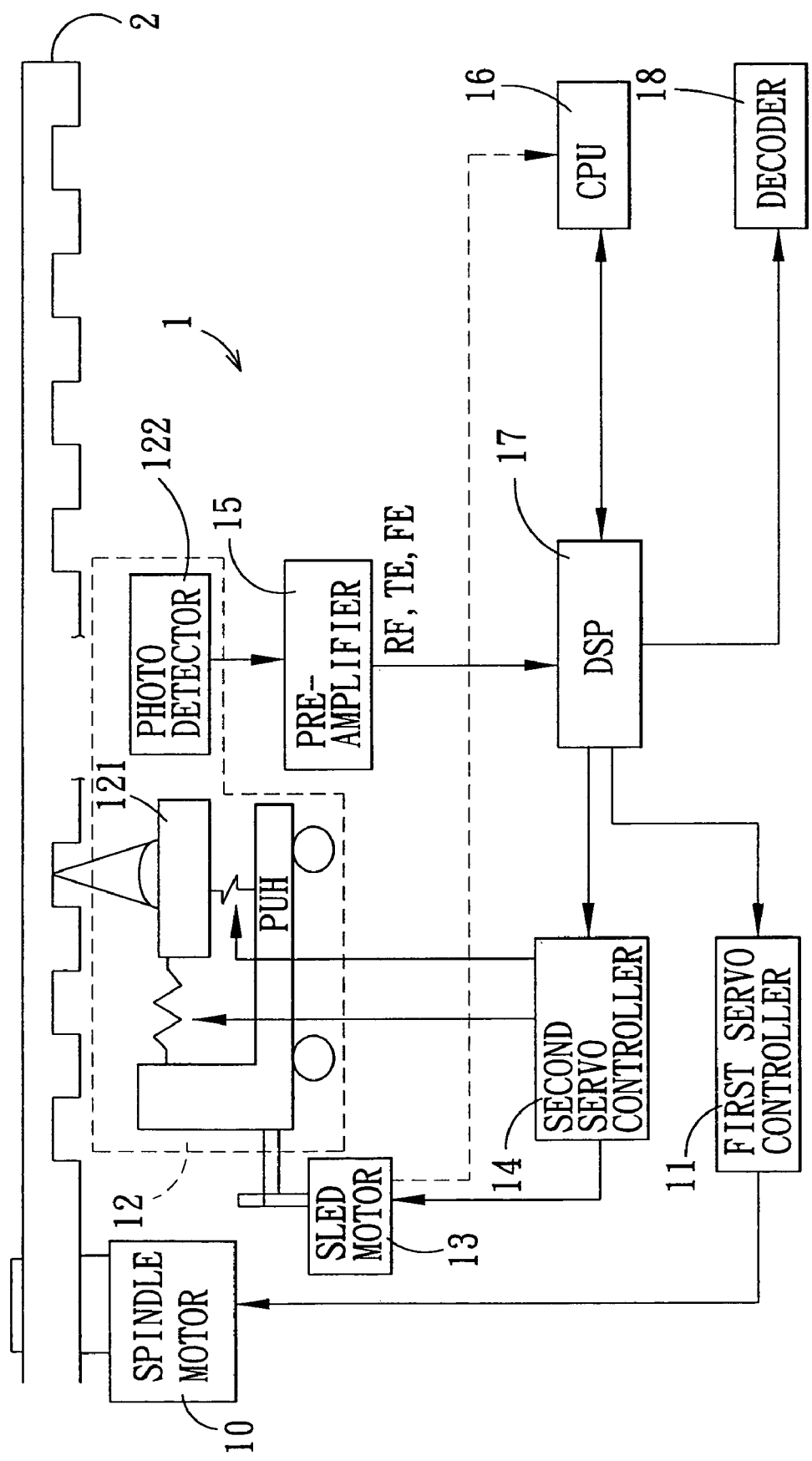
FIG. 1 is a schematic circuit block diagram of a conventional optical recording system.
Figure 2:
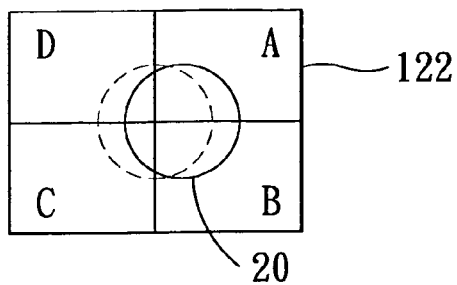
FIG. 2 is a schematic diagram to illustrate optical path deviation of an optical pickup in the conventional optical recording system.

Under normal conditions, when the optical pickup 42 is operated in a focusing and track-locking state, the laser beam reflected from the optical recording medium 2 should coincide with a central portion of the photo detector 423, i.e., the light-sensing regions (A), (B), (C), (D) detect equal amounts of the reflected laser beam, as best shown in FIG. 5. However, due to the aforesaid sacrifices made to lower manufacturing costs of the optical recording system 4, the optical path may deviate such that the light-sensing regions (A), (B), (C), (D) detect unequal amounts of the reflected light beam, as shown in FIG. 2.

To correct optical path deviation of the optical pickup 42, since the laser diode 422, the photo detector 423 and the beam splitter 424 are fixed components of the optical pickup 42, movement of the objective lens 421 through the control of the correcting device 5 is proposed in this invention.

Figure 6:
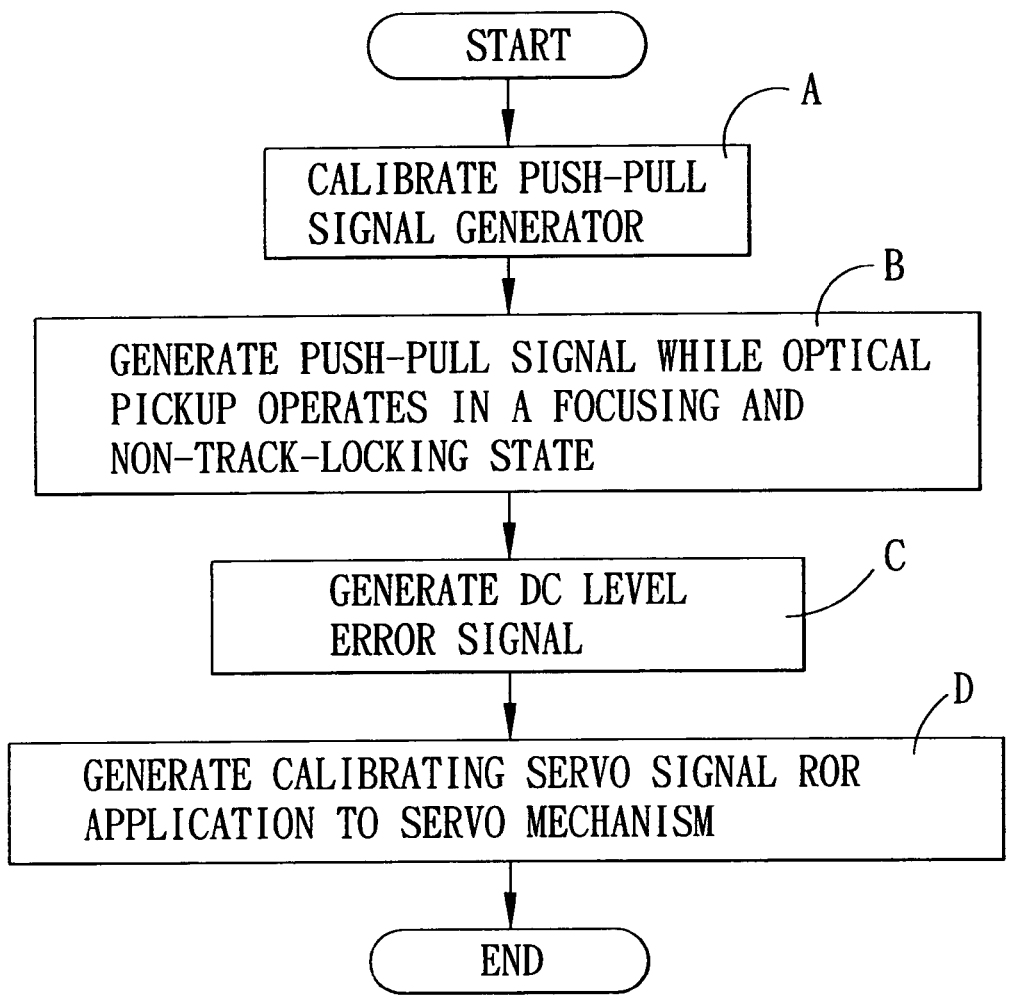
FIG. 6 is a flowchart illustrating how optical path deviation of an optical pickup is corrected according to the present invention.

Referring to FIG. 6, the method for correcting optical path deviation of the optical pickup 42 in the optical recording system 4 according to this invention is shown to include the following steps:

Step (A): The optical recording system 4 is activated to proceed with a calibration procedure for the push-pull signal generator 51 such that the push-pull signal is zero when an input to the push-pull signal generator 51 is zero.

Figure 7:
FIG. 7 illustrates a pull-push signal generated by a push-pull signal generator of the device of the preferred embodiment.

Step (B): During the calibration procedure of step (A), under the control of the CPU 48, the second servo controller 46 operates the optical pickup 42 in a focusing and non-track-locking state. That is, while the optical recording medium 2 rotates, the optical pickup 42 moves in a radial outward direction relative to the optical recording medium 2, and projects a laser beam that crosses grooves 22 and lands 21 of the optical recording medium 2. The reflected laser beam from the optical recording medium 2 is detected by the light-sensing regions (A), (B), (C), (D) of the photo detector 423. Thereafter, the push-pull signal generator 51 generates a push-pull signal, as shown in FIG. 7, from the output of the photo detector 423 according to the amounts of reflected light received by the light-sensing regions based on the following equation: (A+D)−(B+C), i.e., difference of the sum of detected components (A) and (D) and the sum of detected components (B) and (C).

Step (C): The push-pull signal is converted into a digital signal by the A/D converter 52; and the digital signal is processed by the digital low-pass filter 53 to result in a digital DC level, which is subsequently converted by the D/A converter 54 into the DC level error signal in an analog form. Under normal conditions, the DC level of the push-pull signal should be at an ideal level (e.g., zero). If the DC level of the push-pull signal is not at the ideal level, this indicates the presence of optical path deviation of the optical pickup 42, which mandates correction of the objective lens 421.

Step (D): The combiner 55 generates the calibrating servo signal by applying the DC level error signal from the D/A converter 54 as a negative feedback to combine with the servo control signal from the second servo controller 46. The calibrating servo signal is then applied to the voice coil motor 44 of the servomechanism for adjusting the position of the objective lens 421 so as to maintain the DC level of the push-pull signal at the ideal level.

Thereafter, the D/A converter 54 continues to supply the DC level error signal to the combiner 55 such that the calibrating servo signal is provided to the voice coil motor 44 even when the optical pickup 42 is operated in a focusing and track-locking state. As a result, the optical path deviation of the optical pickup 42 attributed to sacrifices made to lower manufacturing costs of the optical recording system 4 can be corrected so as to enhance the recording and playback quality while keeping manufacturing costs low.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for correcting optical path deviation of an optical pickup in an optical recording system, the optical pickup including a laser diode for emitting a laser beam, an objective lens for receiving and projecting the laser beam onto an optical recording medium, and a photo detector for detecting the light beam reflected by the optical recording medium, the optical recording system including a servo mechanism for focusing and track-locking control of the optical pickup, and a servo controller for controlling operation of the servo mechanism, said method comprising the steps of:

a) generating a push-pull signal from output of the photo detector while the optical pickup is operated in a focusing and non-track-locking state;

b) generating a DC level error signal by subjecting the push-pull signal to low-pass filtering; and c) generating a calibrating servo signal based on the DC level error signal and a servo control signal from the servo controller, the calibrating servo signal being applied to the servo mechanism for adjusting position of the objective lens so as to maintain the DC level of the push-pull signal at an ideal level, wherein, in step c), the calibrating servo signal is generated by applying the DC level error signal as a negative feedback to the servo control signal.

2. The method as claimed in claim 1, wherein, in step a), the push-pull signal is generated by a push-pull signal generator that is built into a pre-amplifier of the optical recording system, the pre-amplifier being coupled to the photo detector.

3. The method as claimed in claim 2, wherein the push-pull signal generator is calibrated such that the push-pull signal is zero when an input thereto is zero.

4. The method as claimed in claim 1, wherein, in step a), the push-pull signal is generated according to the output of a light-sensing array of the photo detector.

5. The method as claimed in claim 1, wherein step b) includes:
converting the push-pull signal into a digital signal;
subjecting the digital signal to digital low-pass filtering to result in a digital DC level; and
converting the digital DC level into the DC level error signal in an analog form.

6. The method as claimed in claim 1, wherein the ideal level is zero.

7. The method as claimed in claim 1, wherein the calibrating servo signal is applied to the servo mechanism when the optical pickup is operated in a focusing and track-locking state.

8. An optical recording system comprising:
an optical pickup including a laser diode for emitting a laser beam, an objective lens for receiving and projecting the laser beam onto an optical recording medium, and a photo detector for detecting the light beam reflected by the optical recording medium;
a servo mechanism coupled to said optical pickup for focusing and track-locking control of said optical pickup;
a servo controller coupled to and controlling operation of said servo mechanism; and
a correcting device including
a push-pull signal generator coupled to said photo detector and operable so as to generate a push-pull signal from output of said photo detector while said optical pickup is operated in a focusing and non-track-locking state, a low-pass filter module coupled to said push-pull signal generator and operable so as to generate a DC level error signal by subjecting the push-pull signal to low-pass filtering, and a combiner coupled to said low-pass filter module and said servo controller, and operable so as to generate a calibrating servo signal based on the DC level error signal and a servo control signal from said servo controller, said combiner applying the calibrating servo signal to said servo mechanism for adjusting position of said objective lens so as to maintain the DC level of the push-pull signal at an ideal level, wherein said combiner generates the calibrating servo signal by applying the DC level error signal as a negiative feedback to the servo control signal.

9. The optical recording system as claimed in claim 8, further comprising a pre-amplifier coupled to said photo detector and having said push-pull signal generator built therein.

10. The optical recording system as claimed in claim 8, wherein said push-pull signal generator is calibrated such that the push-pull signal is zero when an input thereto is zero.

11. The optical recording system as claimed in claim 8, wherein said photo detector has a light-sensing array, and said push-pull signal generator generates the push-pull signal according to the output of said light-sensing array of said photo detector.

12. The optical recording system as claimed in claim 8, wherein said low-pass filter module includes: an analog-to-digital converter for converting the push-pull signal into a digital signal; a digital low-pass filter coupled to said analog-to-digital converter and operable so as to subject the digital signal to digital low-pass filtering to result in a digital DC level; and a digital-to-analog converter coupled to said digital low-pass filter and operable so as to convert the digital DC level into the DC level error signal in an analog form.

13. The optical recording system as claimed in claim 8, wherein the ideal level is zero.

14. The optical recording system as claimed in claim 8, wherein said correction device is configured to apply the calibrating servo signal to said servo mechanism when said optical pickup is operated in a focusing and track-locking state.

* * * * *